United States Patent [19]
Honda et al.

[11] Patent Number: 5,456,578
[45] Date of Patent: Oct. 10, 1995

[54] TURBINE HOUSING OF TURBOCHARGER

[75] Inventors: Mamoru Honda, Chiryu; Toshikuni Kusano, Toyota, both of Japan

[73] Assignee: Aisin Seiki Kabushiki Kaisha, Kariya, Japan

[21] Appl. No.: 102,981

[22] Filed: Jul. 28, 1993

[30] Foreign Application Priority Data

Jul. 29, 1992 [JP] Japan ................................ 4-245434

[51] Int. Cl.$^6$ .................................................. F01D 25/24
[52] U.S. Cl. ...................... 415/214.1; 415/173.1; 415/200
[58] Field of Search ............... 415/170.1, 173.1, 415/173.4, 174.4, 177, 178, 196, 200, 203–205, 213.1, 214.1; 75/254; 148/530; 417/407; 428/610, 679, 937, 941; 903/335, 337

[56] References Cited

U.S. PATENT DOCUMENTS

| | | | |
|---|---|---|---|
| 3,836,156 | 9/1974 | Dunthorne | 415/173.4 |
| 3,880,550 | 4/1975 | Corey et al. | 415/173.4 |
| 4,075,376 | 2/1978 | Jaeger | 428/937 |
| 4,122,673 | 10/1978 | Leins | 415/200 |
| 4,754,950 | 7/1988 | Tada et al. | 428/679 |
| 4,766,042 | 8/1988 | Otani | 428/679 |

FOREIGN PATENT DOCUMENTS

| | | |
|---|---|---|
| 0149210 | 7/1985 | European Pat. Off. . |
| 3513882 | 10/1986 | Germany . |
| 62-50546 | 10/1987 | Japan . |
| 2-59284 | 12/1990 | Japan . |
| 3-68529 | 7/1991 | Japan . |
| 649100 | 4/1985 | Switzerland . |

Primary Examiner—Edward K. Look
Assistant Examiner—Christopher Verdier
Attorney, Agent, or Firm—Oblon, Spivak, McClelland, Maier & Neustadt

[57] ABSTRACT

A turbine housing of a turbocharger made of ductile iron and a self-diffused Ni—Cr alloy including C, B and Si fusion-coated to at least the surface of the main portion of the turbine housing. The turbine housing is not likely to be oxidized and deteriorated, and it has durability.

5 Claims, 4 Drawing Sheets

TURBINE HOUSING OF TURBOCHARGER

BACKGROUND OF THE INVENTION

1. Field of the Invention

The present invention relates to a turbine housing of a turbocharger.

2. Description of the Related Art

A turbocharger operates on the energy of high-temperature exhaust gas which can be, for example, at about 900° C. A turbine housing is generally made of Ni-resist iron having high heat resistance. Ni-resist iron is austenite iron containing 20 to 40% by weight of Ni. Since Ni-resist iron is expensive, the unit price of the turbocharger is increased.

Ductile iron is known as a cheap and common material for a turbine housing. It is high Si-ferritic iron containing 3 to 4.5% by weight of Si. However, ductile iron has poor heat resistance as compared with Ni-resist iron. When ductile iron is used as a material for a turbine housing of a turbocharger, the surface of the ductile iron is oxidized and deteriorated by the heat of the high-temperature exhaust gas.

SUMMARY OF THE INVENTION

Concerning a turbine housing of a turbocharger, some portions have a great influence on the efficiency when the surface of the portions is deteriorated, and some portions have less influence on the efficiency when the surface of the portions is deteriorated. A turbine housing has surfaces contacting other members and has a portion opposite to the rotor, and these portions have an especially great influence on the efficiency. Other portions except the above surface and the above portion have no influence on the operation and the efficiency of the turbocharger even if the surface of the portions is deteriorated. Therefore, it is not required that the whole of the turbine housing be made of Ni-resist iron. When the turbine housing is made of ductile iron, it is enough if only the surface of the main portion of the turbine housing has heat resistance.

It is an object of the present invention to provide a turbine housing of a turbocharger in which the turbine housing is made of ductile iron instead of Ni-resist alloy.

It is another object of the present invention to provide a turbine housing of a turbocharger in which the surface of the turbine housing is coated with a cover layer having superior heat resistance. Therefore, the turbine housing is not likely to be oxidized and deteriorated, and it has durability.

In order to achieve the above objects, the inventors have found a turbine housing of a turbocharger made of ductile iron and a self-diffused alloy comprising Ni—Cr alloy including C, B and Si fusion-coated to at least the surface of the main portion of the turbine housing.

The above turbocharger is the apparatus for supplying larger amounts of air into the combustion chamber of internal combustion engines. The above turbine housing is the housing of the apparatus in which the turbine is rotated by exhaust gases as activated gases having high-temperature and high-pressure in internal combustion engines.

The turbine housing of the turbocharger according to the present invention is made of ductile iron. In this ductile iron, graphite has a spheroidal structure. As compared with others, this ductile iron has superior toughness.

The turbine housing of the turbocharger according to the present invention is made of ductile iron, and a self-diffused alloy comprising Ni—Cr alloy including C, B and Si fusion-coated to the surface of the main portion which requires resistance to oxidation. This self-diffused alloy comprises 5.0 to 25.0% by weight of Cr, 0.5 to 4.0% by weight of B, 2.0 to 7.0% by weight of Si, not more than 1.5% by weight of C and the rest of Ni and impurity elements.

In order to obtain resistance to oxidation, the Ni—Cr alloy is used as a self-diffused alloy. The content ratio of Cr is in the range of 5.0 to 25.0% by weight. When the content ratio of Cr is not more than 5.0% by weight, resistance to oxidation is deteriorated. When the content ratio of Cr is more than 25.0% by weight, thermal fatigue strength is deteriorated.

In order to obtain deoxidation, B and Si is added to Ni—Cr alloy. Elements such as Si, B and C are likely to be diffused. When Si, B and C in the self-diffused alloy is exposed to high-temperature, they reduce oxides contained in the surface of the coated-layer of the turbine housing, and they penetrate and diffuse into the base material. Therefore, the coated-layer to which the self-diffused alloy is fusion-coated is integrated with the base material to protect the base material. The content ratio of B is in the range of 0.5 to 4.0% by weight. When the content ratio of B is less than 0.5% by weight, deoxidation is deteriorated. When the content ratio of B is more than 4.0% by weight, heat resistance is deteriorated. The content ratio of Si is in the range of 2.0 to 7.0% by weight. When the content ratio of Si is less than 2.0% by weight, deoxidation is deteriorated. When the content ratio of Si is more than 7.0% by weight, heat resistance is deteriorated. The content ratio of C is not more than 1.5% by weight. When the the content ratio of C is more than 1.5% by weight, deoxidation is deteriorated.

The surfaces of the main portion of the turbine housing which requires resistance to oxidation are the surfaces contacting other members and the surface opposite to the rotor. The surface contacting the other member include the surface contacting the intake manifold, the seat surface which is formed in the turbine housing to open and close the by-pass passage and the surface contacting the exhaust pipe. When resistance to oxidation of these surfaces is deteriorated, oxidized surface is dropped, and it is insufficiently sealed. When the surface opposite to the rotor is oxidized and dropped, the clearance between the rotor and the housing becomes large, and exhaust gases leak. The coating layer which comprises the self-diffused alloy and which is formed by fusion-coating is prevented from being oxidized, so it maintains sealing, and clearance is obtained.

The thickness of the above coated-layer is preferably 100 µm to 250µm. It is required that the turbine housing made of ductile iron is formed in consideration of the thickness of the coated-layer which is formed by fusion-coating.

The methods for fusion-coating are flame fusion-coating, plasma fusion-coating and the like.

According to the above method, when the turbine housing is subjected to an atmosphere of high-temperature exhaust gas, the surface of the turbine housing contacting the other member and the portion opposite to the rotor are not deteriorated. This is because Ni—Cr alloy including C, B and Si is fusion-coated to the turbine housing at the surface contacting the other members and at the portion opposite to the rotor, and they have high resistance. Therefore, when the turbine housing has been used for hours, the efficiency of the turbine is less deteriorated, and the turbine can maintain the efficiency in the early stages.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The Preferred Embodiments according to the present invention will be hereinafter described with reference to FIGS. 1 through 8.

Figure 1:
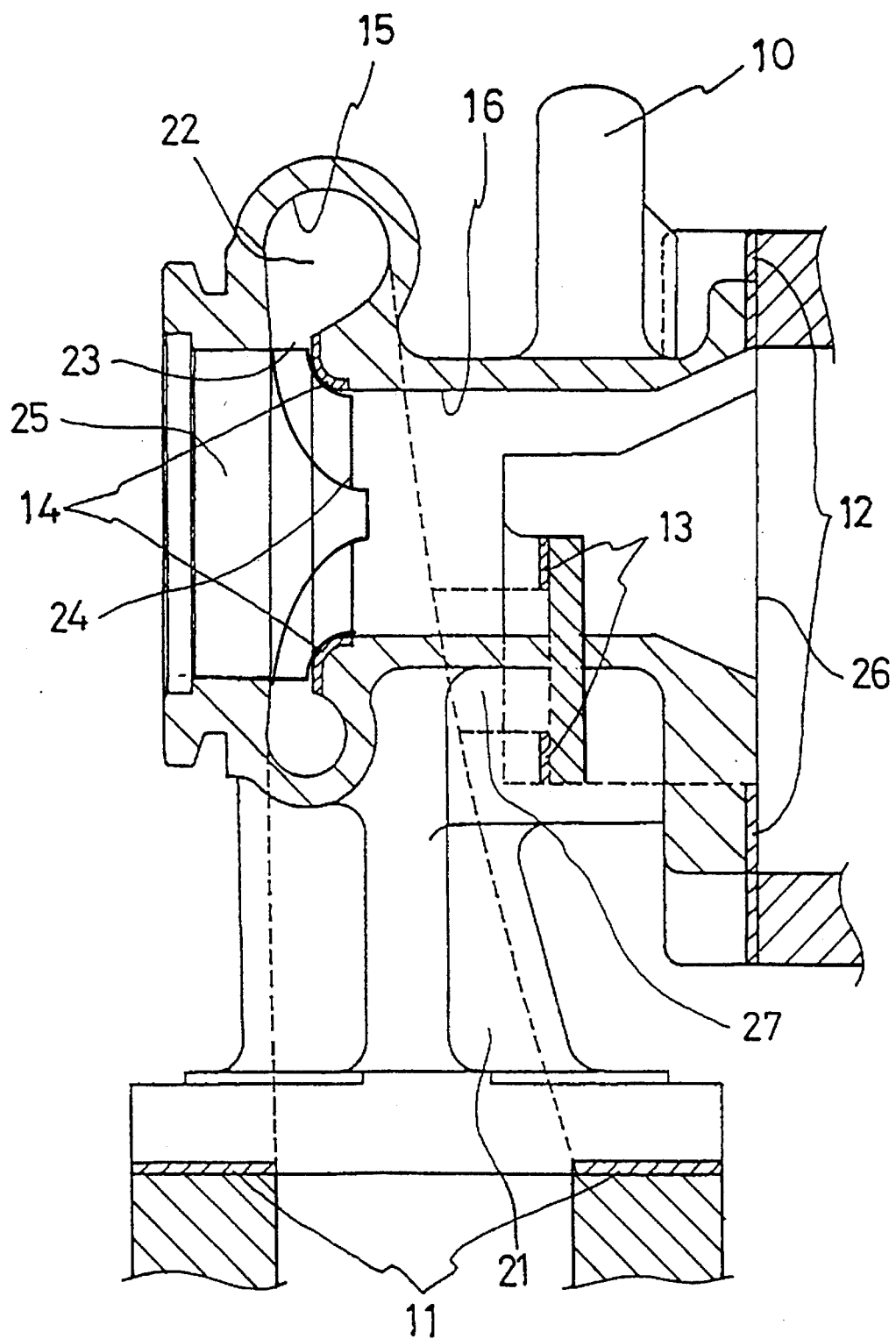
FIG. 1 is a cross-sectional view for showing a turbine housing of a turbocharger in the Preferred Embodiment.

FIG. 1 shows the cross section of the main portion of the turbine housing 10 of the turbocharger in the Preferred Embodiment. The turbocharger housing comprises the turbine housing 10 and the pump housing (not shown). A shaft (not shown) is rotatably held to the turbocharger housing. One end side of the shaft is projected into the turbine housing 10, and the other end side of the shaft is projected into the pump housing. A turbine (not shown) is fixed to one edge of the shaft which is projected into the turbine housing 10, and a pump wing (not shown) is fixed to the other edge of the shaft which is projected into the pump housing.

The turbine housing 10 includes an exhaust gas introduction passage 21, a swirl chamber 22 which is divided by a swirl chamber wall surface 15 which is connected with the rear end of the exhaust gas introduction passage 21, a ring-shaped exhaust nozzle 23 which opens to the inner periphery side of the swirl chamber 22, a turbine chamber 24 which is surrounded by the exhaust nozzle 23 and an axial hole 25. In FIG. 1, the portion on the right side of the axial hole 25 is an exhaust discharge passage which is divided by a surface 16. And, an opening at the right end of the exhaust discharge passage is an exhaust gas outlet 26. A by-pass passage 27 for directly connecting the exhaust gas introduction passage 21 and the exhaust gas outlet 26 is formed in the turbine housing 10. In FIG. 1, the above-described pump housing is fixed to the end surface on the left end side of the axial hole P5. An end surface of an exhaust manifold (not shown) on the outlet side is fixed to an end surface 11 of the exhaust gas introduction passage 21 on the inlet side by way of a gasket (not shown). An exhaust pipe (not shown) is fixed to an end surface 12 of the exhaust gas outlet 26 by way of a gasket (not shown). An opening and closing valve (not shown) is contacted to an end surface 13 of the by-pass passage 27 on the outlet side.

The main body of the turbine housing 10 comprises ductile iron in which the Si content ratio is high. Self-diffused alloy comprising Ni—Cr alloy including C, B and Si is fusion-coated to the end surface 11 of the exhaust gas introduction passage 21 on the inlet side, the end surface 12 of the exhaust gas outlet 26, the end surface 13 of the by-pass passage 27 on the outlet side and a surface 14 opposite to the rotor by which the ring-shaped exhaust nozzle 23 is divided, thereby forming a coating layer having the thickness of 200 μm. The self-diffused alloy comprises 17% by weight of Cr, 3.5% by weight of B, 4.0% by weight of Si, 1.0% by weight of C and the rest of Ni and impurity elements.

In this embodiment, the above-described self-diffused alloy is fusion-coated only to the end surfaces 11, 12, 13 and the surface 14 opposite to the rotor, but it may be fusion-coated to the swirl chamber wall surface 15 and the other surface 16. The fusing point of the self-diffused alloy is comparatively low. When the turbocharger is driven, the self-diffused alloy is subjected to high-temperature exhaust gas. Therefore, it is promoted that the components of the self-diffused alloy, C, B and Si, diffuse into the turbine housing 10, and the coating layer of the self-diffused alloy is firmly connected with ductile iron which constitutes the turbine housing 10.

A turbocharger is assembled with the turbine housing 10 according to the present invention, and it is installed in the engine and practically used for 200 hours. As a result, no oxidation and no leakage of gas from the gasket was generated.

To compare the self-diffused alloy with five sorts of other alloys, heating experiments are performed in such a manner that six sorts of these alloys are let alone in the exhaust gas having a temperature of 900° C. for 100 hours. Comparative Example 1 used Ni—Cr—Mo alloy which comprises 50% by weight of Ni, 35% by weight of Cr and 15% by weight of Mo. Comparative Example 2 used Co—Mo—Cr super alloy which comprises 28% by weight of Mo, 17% by weight of Cr, 3% by weight of Si and the rest of Co. Comparative Example 3 used the super alloy which comprises 75% by weight of $Cr_3C_2$ and 25% by weight of NiCr (comprising 60% by weight of Ni and 40% by weight of Cr). Comparative Example 4 used the super alloy which comprises 80% by weight of $Cr_3C_2$ and 20% by weight of NiCr (comprising 60% by weight of Ni and 40% by weight of Cr). Comparative Example 5 used Ni—Al alloy which comprises 85% by weight of Al and 15% by weight of Ni. In the Comparative Examples, ductile iron is used as the base material, and the surface of the base material is coated with the coating layer having a thickness of 200 μm. The obtained six kinds of samples are let alone in the exhaust gas having a temperature of 900° C. for 100 hours. The result is observed by a cross-sectional microscope.

Figure 2:
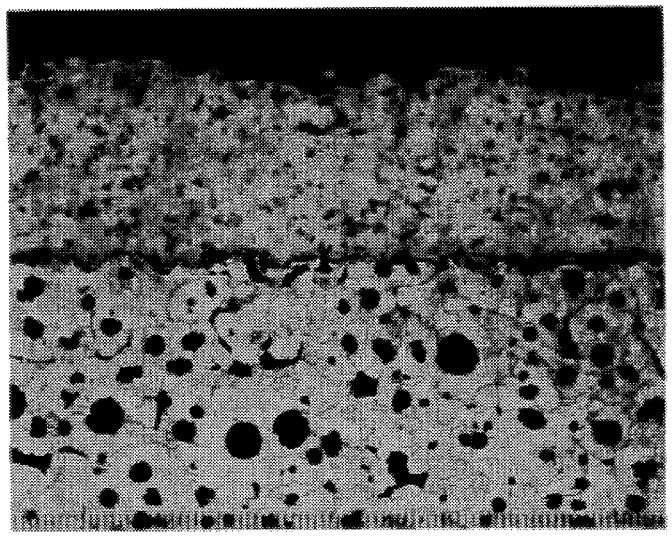
FIG. 2 is a cross-sectional microphotograph for showing the metal structure of the base material and the coating layer which comprises the self-diffused alloy and which is formed by fusion-coating in the Preferred Embodiment before the heating experiment is performed.
Figure 3:
FIG. 3 is a cross-sectional microphotograph for showing the metal structure of the base material and the coating layer which comprises the self-diffused alloy and which is formed by fusion-coating in the Preferred Embodiment after the heating experiment is performed.
Figure 4:
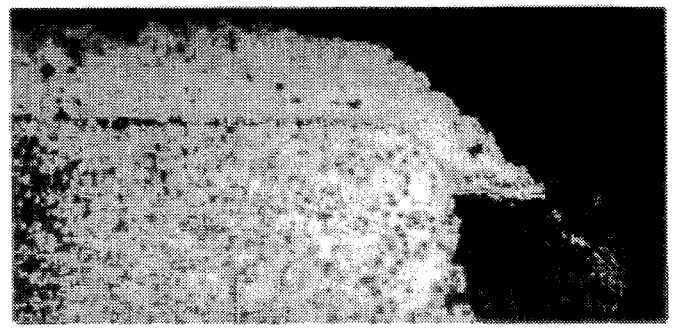
FIG. 4 is a cross-sectional microphotograph for showing the metal structure of the edge portion of the coating layer which comprises the self-diffused alloy and which is formed by fusion-coating in the Preferred Embodiment after the coating layer is let alone in a high-temperature atmosphere.
Figure 5:
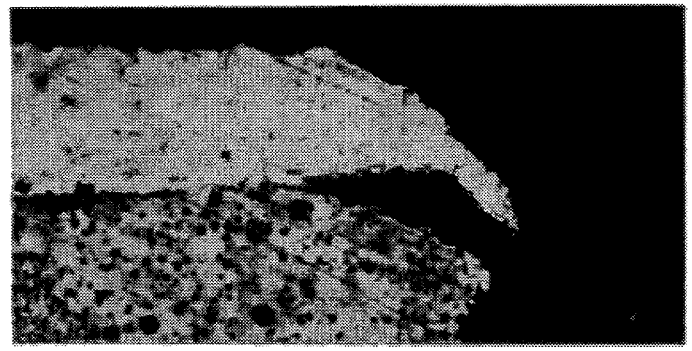
FIG. 5 is a cross-sectional microphotograph for showing the metal structure of the edge portion of the coating layer which comprises the self-diffused alloy and which is formed by fusion-coating in the Comparative Example 2 after the coating layer is let alone in a high-temperature atmosphere.
Figure 6:
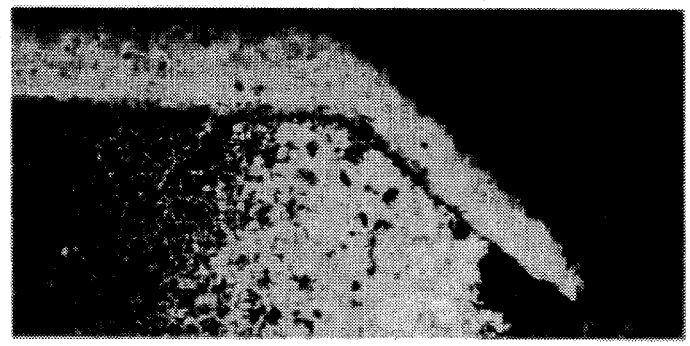
FIG. 6 is a cross-sectional microphotograph for showing the metal structure of the edge portion of the coating layer which comprises the self-diffused alloy and which is formed by fusion-coating in the Comparative Example 3 after the coating layer is let alone in a high-temperature atmosphere.
Figure 7:
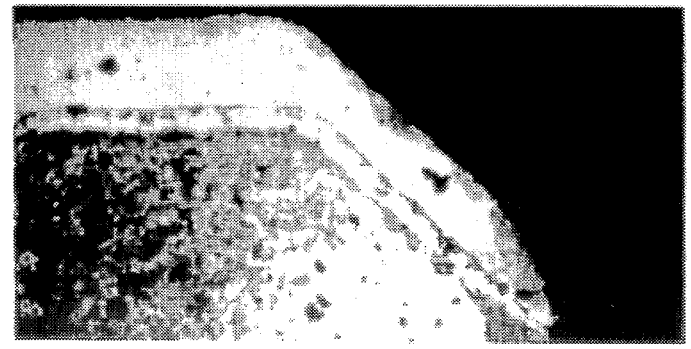
FIG. 7 is a cross-sectional microphotograph for showing the metal structure of the edge portion of the coating layer which comprises the self-diffused alloy and which is formed by fusion-coating in the Comparative Example 4 after the coating layer is let alone in a high-temperature atmosphere.
Figure 8:
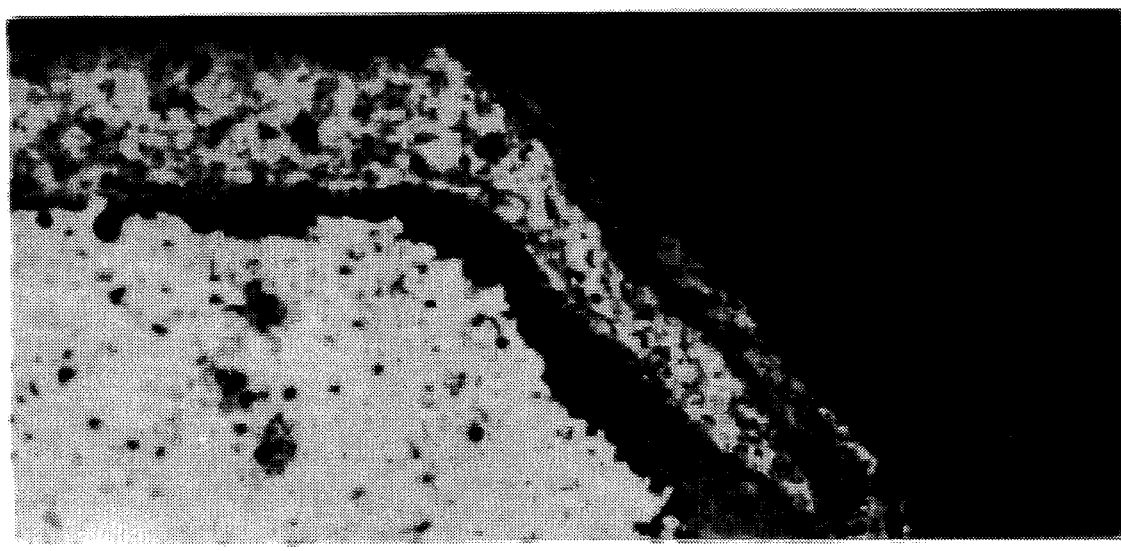
FIG. 8 is a cross-sectional microphotograph for showing the metal structure of the edge portion of the coating layer which comprises the self-diffused alloy and which is formed by fusion-coating in the Comparative Example 5 after the coating layer is let alone in a high-temperature atmosphere.

FIG. 2 is a cross-sectional microphotograph for showing the condition of the base material and the coating layer before the heating experiment is performed. FIGS. 3 and 4 are cross-sectional microphotographs for showing the condition of the base material and the coating layer after the heating experiment is performed. FIG. 3 shows the central part of the coating layer. FIG. 4 shows the edge portion of the coating layer. As seen from FIGS. 2 and 3, since the coating layer is let alone in a high-temperature atmosphere, the number of pores of the coating layer which are generated at the time of fusion-coating is decreased. As shown in FIG. 4, the base material under the edge portion of the coating layer shows no oxidation.

FIGS. 5 to 8 are cross-sectional microphotographs for showing the condition of the edge portion of the coating layer after heating experiments are performed concerning Comparative Examples 2 to 5. Concerning the Comparative Example 2, the coating layer itself shows no change, but the base material under the coating layer shows oxidation. Concerning the Comparative Example 3, the number of pores of the coating layer is decreased, but the base material under the coating layer shows oxidation. Concerning the Comparative Example 4, peeling of the coating layer is generated. Concerning the Comparative Example 5, the coating layer shows no change, but cracks are generated in the diffusive layer which is located between the coating layer and the base material. Furthermore, the number of pores of the coating layer is decreased, but the base material under the coating layer shows oxidation.

As seen from the above results, when the base material and the self-diffused alloy according to the present invention are used together, the most excellent effect is obtained.

As above described, since the turbine housing of the turbocharger according to the present invention is made of ductile iron which has poor heat resistance, the surface of the turbine housing is likely to be oxidized by high-temperature exhaust gas. However, the heat resistance material is fusion-coated to the turbine housing at the surface contacting the other members and at the portion opposite to the rotor, so neither the surface nor the portion are oxidized and deteriorated. Furthermore, since ductile iron is not expensive, the cost of the turbocharger is decreased.

When Ni—Cr alloy including C, B and Si is used as the heat resistance material, the heat resistance material is subjected to high-temperature exhaust gas not only at the time of fusion-coating but also at the time of driving the turbocharger. Bo, the diffusion of C, B and Bi into the turbine housing is promoted to firmly combine the turbine housing and the coating layer of the heat resistance material. Therefore, the coating layer having excellent heat resistance can be formed, and neither the heat resistance material nor the turbine housing is oxidized due to high-temperature exhaust gas.

Having now fully described the invention, it will be apparent to one of ordinary skill in the art that many changes and modifications can be made thereto without departing from the spirit or scope of the invention as set forth herein.

What is claimed is:

1. A turbine housing of a turbocharger comprising,
    (a) ductile iron; and
    (b) an alloy fusion coated on said ductile iron, on the external surfaces of said turbine housing which are in contact with another member,
    wherein said alloy comprises Ni, Cr, C, B and Si.

2. A turbine housing of a turbocharger according to claim 1, wherein said alloy comprises 5.0 to 25.0% by weight of Cr, 0.5 to 4.0% by weight of B, 2.0 to 7.0% by weight of Si, not more than 1.5% by weight of C and the remainder of Ni and impurity elements.

3. A turbine housing of a turbocharger according to claim 1, wherein said alloy is further fusion coated on a surface which is opposite to a rotor rotatably installed into said turbine housing.

4. A turbine housing of a turbocharger according to claim 1, wherein said alloy has a thickness of from 100–250 μm.

5. A turbine housing of a turbocharger according to claim 1, wherein said alloy has a thickness of 200–250 μm.

* * * * *